United States Patent Office 3,533,732
Patented Oct. 13, 1970

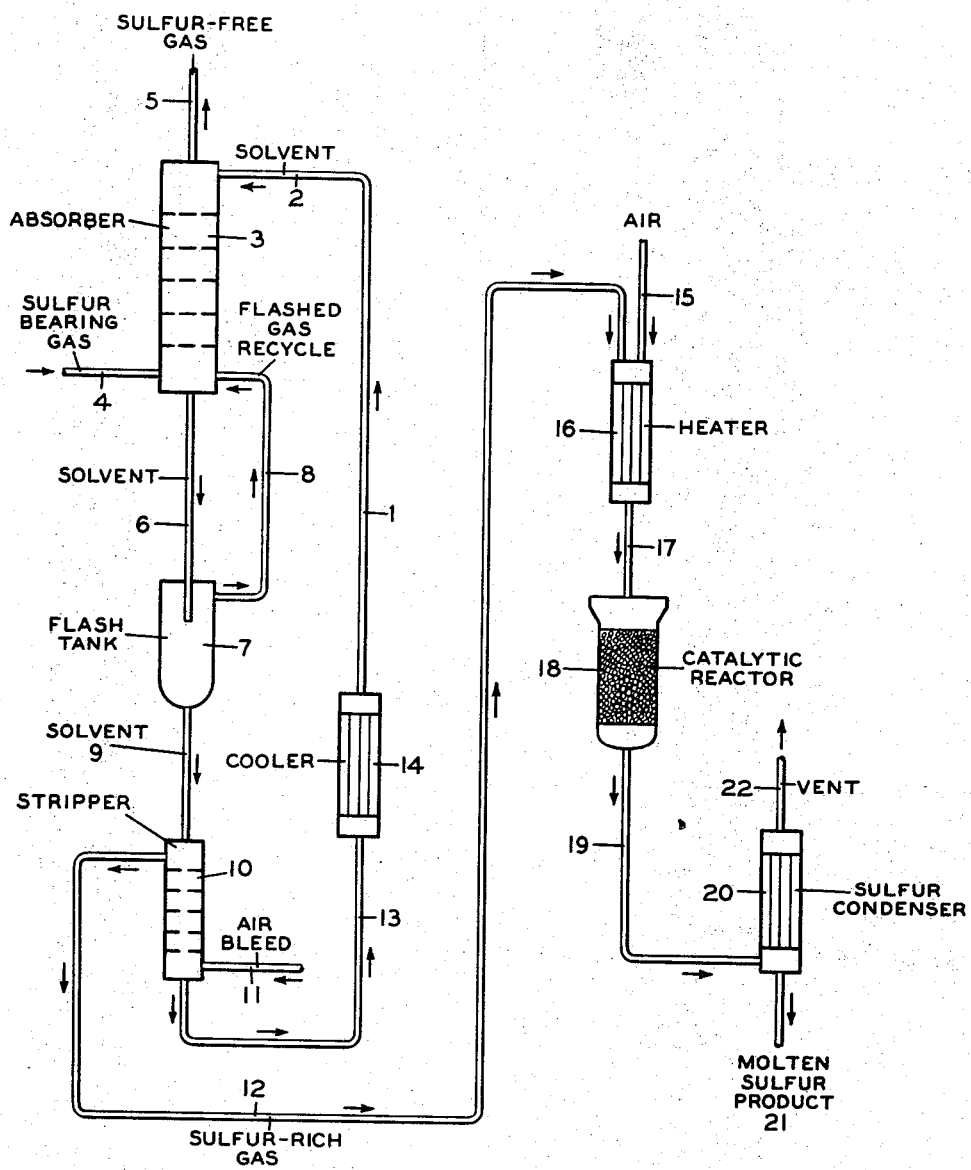

3,533,732
HYDROGEN SULFIDE REMOVAL FROM GAS MIXTURES CONTAINING HYDROGEN SULFIDE AND METHANE
William P. Moore, Chester, and Charles D. Hardin, Hopewell, Va., assignors to Allied Chemical Corporation, New York, N.Y., a corporation of New York
Continuation-in-part of application Ser. No. 505,151, Oct. 25, 1965. This application June 21, 1968, Ser. No. 747,063
Int. Cl. B01d 53/16
U.S. Cl. 23—2
1 Claim

ABSTRACT OF THE DISCLOSURE

A process for treating and separating hydrogen sulfide form natural gas mixtures containing hydrogen sulfide and methane. The process involves the use of a solvent comprising a dialkyl ether of a polyalkylene glycol which absorbs the hydrogen sulfide. The solvent containing hydrogen sulfide is subjected to an oxygen containing gas under conditions which results in the removal of the hydrogen sulfide from the gaseous mixture to a level less than 4 p.p.m. hydrogen sulfide by volume in the gaseous mixture. The solvent is regenerated for reuse by stripping with an oxygen-containing gas, preferably at 110–212° F. which results in partial oxidation of the hydrogen sulfide so that the regenerated solvent contains 10 p.p.m. hydrogen sulfide or less. Recycle of the regenerated solvent to the absorption zone permits removal of the hydrogen sulfide from the natural gas mixture to a level less than 4 p.p.m. hydrogen sulfide by volume in the gaseous mixture.

This application is a continuation-in-part of our copending application Ser. No. 505,151 filed October 25, 1965.

This invention relates to a process for removing hydrogen sulfide from natural gas mixtures containing hydrogen sulfide and methane. More particularly, the invention relates to a process for treating sour natural gas containing hydrogen sulfide and methane to selectively remove the hydrogen sulfide from the gaseous mixture, thereby leaving less than 4 p.p.m. hydrogen sulfide in the gaseous mixture.

Mixtures of hydrogen sulfide with other gases, such as carbon dioxide and methane, are found in a number of industries. For example, mixtures of hydrogen sulfide, carbon dioxide, water, and methane are found as natural gases. It is frequently necessary to remove $H_2S$ from gas mixtures for the purpose of purifying the gas mixture or recovering the $H_2S$ or both. For example, it is often necessary to purify a gaseous hydrocarbon stream to produce sweet, dry gas which will not poison certain catalysts and will contain less than 4 p.p.m. hydrogen sulfide to meet the usual pipeline specifications. Also, it is sometimes advantageous to recover the $H_2S$ as a source of elemental sulfur.

Processes for purification of natural gas by absorption of impurities in a solvent are well-known in the chemical industry as is the need for removal of sulfur-bearing compounds, particularly because of their poisonous effect in some catalytic operations. However, research is continuing in this field because the known purification processes involve one or more serious disadvantages as hereinafter described. Furthermore, in the treatment of natural gas mixtures containing both $H_2S$ and $CO_2$, the removal of $H_2S$ facilitates the subsequent recovery of pure $CO_2$. In such processes it is frequently advantageous to selectively separate the $H_2S$ from the other gases comprising the mixture, thus making possible the use of smaller capacity equipment for the removal and subsequent treatment of the separated gas.

Many hydrogen sulfide removal processes have been known which employ a contacting of the sour gas with $SO_2$ in the presence of a solvent. For example, U.S. Pat. 3,170,766 relates to an apparatus for removing hydrogen sulfide from sour natural gas and recovering, as elemental sulfur, the sulfur content of the hydrogen sulfide. In particular, the sour gas is contacted with sulfur dioxide in the presence of a concentrated aqueous solution of a neutral, inert organic solvent which acts both as a catalyst and as a medium for the reaction between the hydrogen sulfide and sulfur dioxide. The reaction is virtually instantaneous, and particles of sulfur are formed and dispersed in solution. While the patent discloses di-ethers of alkylene glycols, it should be noted that such glycols are utilized strictly as a carrier for the sulfur dioxide, the latter being the active reagent. Moreover, in the process of this patent, the hydrogen sulfide cannot be recovered as such, but must be converted to sulfur.

It has also been proposed to use a normally liquid solvent for hydrogen sulfide for its recovery. In this case, absorption of the hydrogen sulfide is almost wholly by means of a physical bond between the hydrogen sulfide and the solvent. Regeneration of such solvent absorption medium is readily accomplished by stripping the same with an inert gas whereby bulk removal of the hydrogen sulfide can be economically effected. Because of the limitation imposed by the equilibrium between the hydrogen sulfide in the gaseous mixture and that in the recycled absorption medium, however, it is generally not possible to reduce the hydrogen sulfide content of such gaseous mixture to nearly as low a level as is frequently required. The following prior art patents fall in this general category.

U.S. Pat. 3,079,238 is directed to a process of removing hydrogen sulfide from natural gas wherein water alone is employed as the principal solvent. Water is a relatively poor solvent for hydrogen sulfide. The process includes a contacting of the gas with water and passing same through a multistage desorption system, each succeeding stage of desorption having successively lower pressures. The reactants are then heated to about 1800° F. in a Claus furnace whereupon $SO_2$ is drawn off and combined with the remaining portion of the sulfur laden gases issuing from a flash stripper. These reactants are then fed into a reactor whereupon the sulfur values in both of the reactants are reclaimed as elemental sulfur. Thus, relative to natural gas purification, it is apparent that this patent is concerned merely with a well-known, complex, costly, water absorption system. The method for sulfur recovery is only indirectly related to the present invention which is primarily directed to separating hydrogen sulfide from natural gas efficiently and completely and does not require recovery of the hydrogen sulfide as sulfur.

U.S. Pat. 2,781,863 is concerned with the simultaneous removal of an acidic gas contaminant and moisture from a mixed gaseous feed stock using an anhydrous liquid absorbent composition, preferably combined with a hydrocarbon. Numerous liquid absorbents, including monoethers, monoesters and diesters of polyalkylene glycols are disclosed; however, it should be noted that the patent neither discloses dialkyl ethers of polyalkylene glycols nor suggests the use thereof in a gas purification system.

It can be seen, therefore, that the prior art processes for removal of hydrogen sulfide from natural gas fall into two categories:

(1) Methods involving absorption of the hydrogen sulfide in a solution containing a reactive substituent, such as alkanolamine or sulfur dioxide, which react chemically with the hydrogen sulfide, thereby rendering it possible to remove the hydrogen sulfide to an extremely low level, yet, correspondingly causing recovery of the hydrogen sulfide to be difficult and sometimes impossible.

(2) Methods involving use of a liquid solvent for hydrogen sulfide. In such methods, absorption of the hydrogen sulfide is by means of a physical bond between the hydrogen sulfide and the solvent, the latter being regenerated by stripping the bulk of the hydrogen sulfide with an inert gas. With such methods a part of the hydrogen sulfide is not stripped from the solvent due to equilibrium limitations and, accordingly, in subsequent extraction operations, it is not possible to reduce the hydrogen sulfide to a very low level.

We have now found that, unexpectedly, these two absorption systems can be combined in such a way that bulk removal of the hydrogen sulfide constituent from a gaseous mixture containing the same and reduction of the amount of such hydrogen sulfide to an extremely low level can be simultaneously effected in a very economical manner with avoidace to a large extent of the disadvantages inherent in each system alone.

Accordingly, it is an object of this invention to provide a simple and efficient method for purifying gases containing hydrogen sulfide.

Another object of this invention is to provide a low-cost process utilizing a single absorber for removing hydrogen sulfide from sour natural gas containing up to 25% or more hydrogen sulfide to yield sweet gas containing as low as 1 p.p.m. hydrogen sulfide and 2 p.p.m. total sulfur, thereby rendering same capable of being well within pipeline specification levels. Moreover, the process may be adjusted easily for the selective removal of hydrogen sulfide in the presence of carbon dioxide.

A further object of the invention is to provide a more economical process for the recovery of elemental sulfur from natural gas containing hydrogen sulfide.

The basic method for recovering sulfur from hydrogen sulfide is known and may be represented by the following equations:

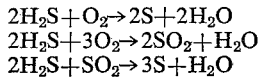

$$2H_2S+O_2 \rightarrow 2S+2H_2O$$
$$2H_2S+3O_2 \rightarrow 2SO_2+H_2O$$
$$2H_2S+SO_2 \rightarrow 3S+H_2O$$

One embodiment of the present invention includes this known method for recovery of sulfur from hydrogen sulfide, but our basic gas purification process of this invention does not require recovery of hydrogen sulfide as sulfur.

In accordance with this invention, the process includes: (a) contacting a gaseous mixture containing hydrogen sulfide with a liquid solvent comprising a normally liquid dialkyl ether of a polyalkylene glycol under conditions to effect absorption of the hydrogen sulfide in the solvent; (b) passing the solvent containing the absorbed hydrogen sulfide to a stripping zone maintained at a pressure substantially lower than that in the absorption zone; (c) subjecting the solvent containing hydrogen sulfide in such stripping zone to the action of an oxygen-containing gas at temperatures of about 30 to 212° F. to effect removal of the hydrogen sulfide therefrom; and (d) returning desorbed solvent to the absorption zone for further contact with the gaseous mixtures.

Desirably, the process is further capable of permitting the recovery of sulfur as a result of (e) passing the gas mixture containing hydrogen sulfide and air from the stripper to a preheater where it is heated to 300 to 800° F., then to a bauxite catalyst bed operating at 300 to 800° F. where the hydrogen sulfide is converted to sulfur; and (f) discharging the resulting mixture of air, sulfur and water vapor to a condenser where sulfur is condensed as liquid sulfur.

By this process, the sour gas subjected to steps (a), (b) and (c) is purified essentially free of hydrogen sulfide and, additionally, in steps (e) and (f) the hydrogen sulfide is converted to elemental sulfur and recoverd.

Very little oxidation of the hydrogen sulfide occurs in the stripping zone at 30 to 212° F.; however, at these conditions, the last traces of hydrogen sulfide in the solvent are oxidized, particularly at temperatures above 100° F. so that the desorbed solvent being returned to the absorption zone is practically free of hydrogen sulfide. As a result, this permits absorption of hydrogen sulfide from the natural gas to a surprisingly low level, for example, to less than 4 p.p.m. hydrogen sulfide in the treated natural gas mixture.

We have found that in the present process one cannot equate monoethers of polyglycols with the diethers, although monoethers would be desirable from the standpoint of solvent cost. It has long been recognized that monoethers and diethers are nonequivalents in the art due to their chemistry as well as the cost differentials in the production thereof. This is particularly evident when one considers that diethers are generally prepared by starting with monoethers and subsequently in the process, expensive reagents, such as sodium, are required to obtain the diethers. It is further evident that with monoethers, one end of the chain is an alcohol, thereby resulting in said monoethers having a high viscosity with relatively poor flow properties. Conversely, both ends of a diether chain are ethers which cause the resulting molecule to possess a low viscosity with relatively good flow properties. Further, it has been found that the alcohol group of the monoethers is subject to oxidation in the presence of air, especially under the acid conditions of the stripper zone, which conditions are inherent in the present process because hydrogen sulfide is an acid gas. Such oxidation is in accord with prior art teaching that points out the need for controlling the pH of glycol solutions to avoid oxidation or even autoxidation. Generally, the glycol pH should be maintained slightly on the alkaline side, from 7 to 8.5.

In view of the partial oxidation of hydrogen sulfide occurring in the stripping zone in the present process and the fact that ethers can form peroxides, some work was done to evaluate the extent of peroxide formation in dimethyl ethers of polyethylene glycols. Surprisingly, no degradation of solvent was detected during four months of pilot plant operations and the solvent showed no peroxide content.

Any dialkyl ether of a polyalkylene glycol that is normally a liquid and remains so under the conditions of operation can be utilized as the ether component of the solvent. Advantageously the liquid glycol ether comprises a dimethyl ether of a polyethylene glycol. Illustrative of specific compounds are the dimethyl ether of diethylene glycol, the dimethyl ether of triethylene glycol, the dimethyl ether of tetraethylene glycol, the dimethyl ether of pentaethylene glycol, the dimethyl ether of hexaethylene glycol, and the dimethyl ether of heptaethylene glycol. While any one of these six polyethylene glycol ethers may be so used and the dimethyl ether of tetraethylene glycol is preferably used, it has been found that a mixture of all six of such polyethylene glycol ethers is generally as effective for all practical purposes. For convenience, this mixture of dimethyl ethers of polyethylene glycol is hereinafter designated as DMPEG.

Contact of a gaseous mixture with the polyalkylene glycol dialkyl ether solvent may be effected at any desired pressure. As a practical matter, however, the gaseous mixture is contacted with the solvent at a superatmospheric pressure sufficiently high to obtain a substantial degree of solution in the glycol ether solvent of the hydrogen sulfide present in such gaseous mixture. The degree of solution of the $H_2S$ in such glycol ether component increases, of course, as the pressure is increased; however, pressure in the absorption zone may be in the range 15 to 1000 p.s.i.a. or higher. The relatively large capacity of polyalkylene glycol ether compounds to absorb hydrogen sulfide is indicated in following table which compares DMPEG with four solvents commonly used in gas purification:

| | Temp., °F. | Cc. H₂S solubility (STP)/cc. Solvent | | |
|---|---|---|---|---|
| | | 5 p.s.i.g. | 25 p.s.i.g. | 50 p.s.i.g. |
| Water | ca. 75 | 1.5 | 3.0 | 4.5 |
| Sulfolane | ca. 75 | 11.2 | 21.7 | 37.4 |
| Sulfinol solvent | ca. 75 | 37.4 | 55.3 | 70.2 |
| Aqueous 20% monoethanolamine | ca. 75 | 65.8 | 70.3 | 72.5 |
| DMPEG | 80 | 24.7 | 52.9 | 90.8 |
| DMPEG | 40 | 59.3 | 138.8 | 362.8 |
| DMPEG | 10 | 169.4 | 362.0 | 1,471.0 |

These data further indicate that in the present process regardless of the total pressure in the absorption zone, the partial pressure of the hydrogen sulfide in gas fed should preferably be 5 p.s.i.g. or greater and desirably 25 p.s.i.g. or greater.

The temperature at which the gaseous mixture is contacted with the present solvent is not critical. Since the acidic gas constituent of the gaseous mixture dissolves in the glycol ether component of the solvent to a greater extent as the temperature is lowered, it will be appreciated that as low a temperature should be used as is compatible with the overall economical operation of the present procedure. By way of example only, a temperature of 0° to 125° F. may be used.

As a preferred embodiment, the present procedure may be effectively carried out by contacting the gaseous mixture in an absorption zone or tower containing 14 to 40 plates, with the solvent at a pressure of 150–1000 p.s.i.a. or higher, and at a partial pressure of the hydrogen sulfide of at least about 5 p.s.i.g., to effect absorption in the solvent of the hydrogen sulfide constituent contained in such gaseous mixture. The solvent fed to the absorption zone is preferably about 0.5–3.0 pounds of solvent per standard cubic foot of acid gas to be absorbed. Temperature in the absorption zone is preferably maintained at 0–125° F., with temperature less than about 100° F. at the top of the zone.

Thereafter, solvent from the absorption zone containing absorbed gas is passed to a stripping zone maintained at about atmospheric pressure or lower, wherein the solvent containing absorbed gas is stripped with air at a temperature of 30–212° F. Ideally with pressures 350 mm. of mercury and below, a temperature in the range of 30–100° F. is preferred. Similarly with pressures increasing from 350 mm. of mercury to atmospheric, a temperature range of 100–212° F. is preferred. It has been found, however, that with the increased temperature and pressure, oxidation of the H₂S is enhanced for removal thereof, which is described in more detail hereinafter.

About 0.2–2 standard cubic feet of stripping air per pound of solvent is utilized to effect removal of the absorbed gas from the solvent. A 10–20 foot packed stripping column is generally preferred, but a plate column may be used. Desorbed solvent containing as low as 1–10 p.p.m. hydrogen sulfide is returned to the absorption zone for further contact with the gaseous mixture. This procedure permits removal of hydrogen sulfide from sour natural gas containing up to 25% or more hydrogen sulfide to yield sweet gas containing 1–4 p.p.m. hydrogen sulfide.

Generally the absorption zone comprises a packed or plate absorption column, into the bottom of which the gaseous mixture is introduced for countercurrent contact with the solvent introduced at the top of the column. Similarly, the stripping zone comprises a packed or plate stripping column, into the top of which solvent containing absorbed gas is introduced and in which such absorbed gas is separated from the solvent by the combined effect of the pressure reduction, heat supplied to the column, and stripping air present in the column. Only a small part of the hydrogen sulfide is oxidized in the stripping zone, and this oxidation is significant only at the base of the zone. However, this oxidation is important because the chemical reaction serves to lower the hydrogen sulfide content of the desorbed solvent at the base of the zone to such a low value that the solvent recycled to the top of the absorption zone is effective to lower the hydrogen sulfide content of the treated natural gas to meet pipe line specifications. Oxidation therefore serves to overcome adverse equilibrium values normally present in a solvent process.

We have found that oxidation of the hydrogen sulfide by oxygen of the air at the relatively low temperatures in the stripping column may be enhanced by packing the stripping column, at least near the bottom of the column, with an oxygen catalyst, such as activated carbon granules, alumina, or vanadium pentoxide. It should be understood that while it is desirable to oxidize the last traces of hydrogen sulfide which may be present near the bottom of the column, it is not desired to oxidize any appreciable amount of the bulk of the hydrogen sulfide, thereby precluding the formation of any appreciable sulfur in the system.

Provision is preferably made, prior to the introduction of the solvent containing absorbed gas into the stripping column, for subjecting such solvent to flashing in one or more flash tanks maintained at a pressure intermediate that in the absorption column and that in the stripping column for substantial separation of any small amounts of absorbed gases other than the hydrogen sulfide from the solvent so that the stripped hydrogen sulfide can be recovered from the stripping column in a relatively pure state. As indicated, air is advantageously added in the stripping column to provide for stripping of the dissolved hydrogen sulfide constituent from the solvent.

In accordance with a preferred embodiment the hydrogen sulfide which has been stripped from the solvent, together with the air used for stripping, is mixed with additional air, preheated and fed to a catalytic reactor. Here, the sulfur compounds are oxidized to yield elemental sulfur, sulfur dioxide and water. The sulfur dioxide reacts with hydrogen sulfide to yield more elemental sulfur and water. These products pass to a condenser where the sulfur product is collected as a liquid and water vapor is vented to the atmosphere.

The accompanying drawing is a diagrammatic flow sheet illustrating one method of practicing the present invention.

Gas containing hydrogen sulfide enters through line 4 at the bottom of an absorption column 3 and passes through at a rate of 10 to 200 cu. ft./(minute) (sq. ft.), cross sectional area. A gas flow in the range or 130 to 150 cu. ft./(minute) (sq. ft.) is preferred. Cooled DMPEG solvent is fed through line 1 to the top tray 2 at a rate of 5 to 35 gallons/(minute) (sq. ft.) with the preferable range being 10 to 15 gallons/(minute) (sq. ft.). The solvent is recycled material and will normally contain small amounts of H₂S. The incoming solvent temperature will be about 0 to 120° F., with 45 to 65° F. especially preferred. Discharging solvent temperatures will be about 5–40° F. higher than inlet temperatures. The column can be operated at pressures in the range of 15 to 1000 p.s.i.a. The hydrogen sulfide-rich solvent leaving the bottom of the absorber through line 6 will contain up to 8% H₂S. The gas effluent leaving through line 5 from the top of the absorber will be essentially sulfur free.

The DMPEG solvent discharged from the absorber through line 6 is flashed in the flash tank 7 operating at pressures of 15 to 200 p.s.i.a. Solvent temperature here is in the range of 5 to 125° F. with 40 to 70° F. preferred. The gas through line 8 from flashing operation contains process gas and inerts which are recycled to the absorber. Practically all of the hydrogen sulfide remains in the effluent solvent passing through line 9. The solvent then passes through line 9 from the flash tank to the stripper 10 which can be operated either at atmospheric or lower pressure. Solvent temperatures in the stripper may be between 30 and 212° F. to effect removal of the hydrogen sulfide therefrom. Stripping temperatures are generally lower, say 30 to 100° F., at reduced pressures. Somewhat higher temperatures, preferably 100 to 190° F., are generally used when the stripper is operated at or about atmospheric pressure. A flow of air through line 11, up to 100 cu. ft./(minute) (sq. ft.), is passed into the stripper to aid desorption. Normally, about 0.2–2 standard cubic feet of air is used per pound of solvent fed to the column. Oxidation of a small part of the $H_2S$ occurs, particularly at advanced temperatures. Stripping lowers the $H_2S$ concentration in the solvent to preferably 1 to 20 p.p.m. The effluent gas and air mixture passing through line 12, containing $H_2S$, is preferably passed to the sulfur recovery system. The spent solvent through line 13 is then recycled to cooler 14.

Additional air through line 15 is mixed into the gas stream to reduce the $H_2S$ concentration to about 5%. The mixture is preheated in the heater 16 to about 300 to 800° F. The heated mixture then passes through line 17 to a catalytic reactor 18 containing bauxite catalyst and the hydrogen sulfide is converted to elemental sulfur and water. The catalytic reactor 18 is also operated in the range of 300 to 800° F.; however, the temperature in the reactor is somewhat higher than the temperature of the inlet gas because the overall reaction is exothermic. A mixture of air, sulfur and water vapor is discharged from line 19 from the catalytic reactor 18 into a condenser 20 operating at 235 to 400° F. Preferred operation is in the range of 240 to 300° F. The condenser acts as a separator with molten sulfur leaving the bottom through line 21 at about 250° F. The excess air and water vapor are vented to the atmosphere through line 22. The sulfur product can be kept molten or allowed to solidify depending on its final commercial use.

The invention will be described further in conjunction with the following examples which are not intended to be limitative in nature.

EXAMPLE I

Natural gas 4 containing 736 p.p.m. $H_2S$ entered the bottom of a 20-plate absorption column 3 having cross section of 0.754 sq. ft. at a rate of 104.0 standard cubic feet per minute (s.c.f.m.). DMPEG solvent 1, which was recycled in the process, containing about 20 p.p.m. $H_2S$ entered the top of the column 2 at 8.8 gallons/minute. The column was operated at 460 p.s.i.a. and with solvent temperatures of 48° F. at the inlet and 55° F. at the exit. The effluent solvent contained 81 p.p.m. $H_2S$ in effluent gas 5.

The solvent was then flashed in the flash tank 7 at 95 p.s.i.a. and at a temperature of about 46° F. Desorbed gas 8 was recycled to the absorber and the solvent was fed to stripper 10. The stripper was a 10-plate column having a cross-section of about 1.77 sq. ft. The stripper was operated at 20 mm. Hg (absolute) and with solvent temperature of about 50° F. Air was added at the rate of 0.30 s.c.f.m. at the bottom of the column to aid in stripping the $H_2S$. The $H_2S$ concentration in the solvent was reduced to about 20 p.p.m. The solvent 13 was then cooled in the cooler 14 to 48° F. and recycled to the absorber.

The $H_2S$-air gas mixture 12 (containing 0.02 s.c.f.m. of $H_2S$) from the stripper was mixed with 0.08 s.c.f.m. or air 15; preheated in the heater 16 to 500° F. and then fed 17 to the reactor 18 containing 4.8 mesh Porocel catalyst (which was an activated bauxite with low iron content) operating at 550° F. The sulfur and water 19 vapors from the reactor were passed to the condenser 20 operating at about 250° F. The sulfur 21 was condensed and left the bottom of the condenser at 250° F. The water vapor and air 22 were vented to the atmosphere. Yield of elemental sulfur was about 92% of theory based on $H_2S$ in the natural gas.

EXAMPLE II

This example demonstrates that the process can be operated with excellent results when the stripping zone is at about atmospheric pressure.

Natural gas containing 24.4% by volume $H_2S$ entered the bottom of a 40-plate absorption column 3 having a cross section of 0.2 sq. ft. at a rate of 8.3 standard cubic feet per minute (s.c.f.m.). Recycled DMPEG solvent containing essentially no $H_2S$ entered the top of the column at 2.86 pounds per minute. The column was operated at 510 p.s.i.a. and with solvent temperatures of 45° F. at the inlet and 83° F. at the exit. The effluent solvent contained 6.7 weight percent $H_2S$. Effluent gas from the top of the absorbed column contained 2 p.p.m. by volume $H_2S$. The exit solvent was then flashed in a flash tank at 66 p.s.i.a. at a temperature of about 48° F. Desorbed gas may be recycled to the absorber. The solvent was advanced through heat exchangers where the temperature of the solvent was increased to 183° F. The resulting gas-liquid mixture was then passed to the top of the stripper which was operated at about atmospheric pressure. The stripper was provided with a gas-disengaging section at the top 18 inches in diameter and 30 inches tall, below which was the packed section of the stripper having a cross-sectional area of 0.114 sq. ft. containing 20 feet of conventional, inert ⅜-inch packing. Solvent passed down through the stripper column and countercurrently contacted air, which passed up through the stripper at 0.8 s.c.f.m. The desorbed gas and stripping air passed through a condenser which cooled the gas to about 86° F. and condensed the solvent vapor, which was returned to the top of the stripper. The cooled gas contained the recovered hydrogen sulfide. The lean solvent at the bottom of the stripper at 124° F. was essentially free of hydrogen sulfide, i.e., about 10 p.p.m. of hydrogen sulfide. The lean solvent was cooled to 45° F. in interchangers and was then injected into the absorber to start the cycle again.

EXAMPLE III

This example demonstrates that the use of air in the stripper is important in comparison with use of an inert gas.

Example II was continued at the same conditions except that 0.8 s.c.f.m. of hydrogen sulfide-free natural gas was passed up through the stripper in place of the same volume of air. Surprisingly, the hydrogen sulfide in the gas effluent from the absorber would no longer meet pipe line specifications. The hydrogen sulfide content of the gas effluent from the absorber had increased four fold to 8 p.p.m. Additional tests confirmed this result, and it was then determined that the oxygen in the air fed to the stripper actually oxidized the last traces of the hydrogen sulfide in the solvent. This oxidation led to a beneficial effect in the absorber in that the solvent recycled from the stripper to the absorber was essentially free of hydrogen sulfide. Correspondingly, the gas effluent from the top of the absorber was reduced in hydrogen sulfide. It will be understood that the hydrogen sulfide content of the solvent at the top of the absorber is most critical with respect to obtaining purified natural gas containing as low as 2 p.p.m. hydrogen sulfide, as was done in Example II.

EXAMPLE IV

In tests similar to Example II, inlet natural gases containing 25, 15 and 5 volume percent hydrogen sulfide with 5 volume percent $CO_2$ in each case were all reduced to 1 p.p.m. $H_2S$ in the 40-plate absorber at 1.0, 1.2, and 1.9 pounds solvent per standard cubic foot of hydrogen sulfide to be absorbed. A selectivity for $H_2S$ over $CO_2$ was demonstrated.

EXAMPLE V

In tests similar to Example II, the bottom 10% of the inert packing in the stripping column was substituted with 8–20 mesh (U.S. standard screen size) activated granular carbon, such as Norite. Surprisingly, it was found that the activated carbon enhanced the oxidation of the last traces of hydrogen sulfide in the solvent thereby enabling the recycle of substantially pure solvent to the absorption column and production of relatively pure natural gas.

While the above describes the preferred embodiments of the invention, it will be understood that departures may be made therefrom within the scope of the specification and claim.

We claim:

1. A process for substantially eliminating hydrogen sulfide from a natural gas containing methane and hydrogen sulfide, which comprises the steps of:

(a) contacting the natural gas containing hydrogen sulfide countercurrently with a liquid solvent comprising a normally liquid mixture of dimethyl ethers of diethylene glycol, triethylene glycol, tetraethylene glycol, pentaethylene glycol, hexaethylene glycol and heptaethylene glycol in an absorption zone containing 14 to 40 plates, at a pressure of 150–1000 p.s.i.a., at a temperature less than 100° F. at the top of the absorption zone, said solvent being fed to the top of the absorption zone at a rate of about 0.5–3.0 pounds of solvent per standard cubic foot of gas to be absorbed, whereby substantially all of the hydrogen sulfide in the natural gas is absorbed into the solvent:

(b) passing the solvent containing the absorbed hydrogen sulfide to the top portion of a stripping zone maintained substantially at atmospheric pressure, said stripping zone having a temperature of 100°–212° F., the temperature of the solvent fed to the stripping zone being at least about 183° F., whereby the bulk of the hydrogen sulfide is stripped from the solvent in the top portion of the stripping zone;

(c) subjecting the solvent containing residual hydrogen sulfide in such stripping zone to the oxidizing action of about 0.2–2 standard cubic feet of air per pound of solvent and at a temperature of at least 100° F. to oxidize residual hydrogen sulfide near the base of the stripper to effectuate removal of the hydrogen sulfide therefrom, said residual hydrogen sulfide being oxidized by the oxygen in said air until the solvent at the base of the stripper is essentially free of hydrogen sulfide;

(d) returning desorbed solvent essentially free of hydrogen sulfide to the top of the absorption zone for further contact with the gaseous mixture; and (e) recovering from the absorption zone a resultant sweet natural gas containing about 1–4 p.p.m. hydrogen sulfide, whereby said natural gas meets pipeline specifications without further treatment.

References Cited

UNITED STATES PATENTS

| | | | |
|---|---|---|---|
| 3,284,158 | 11/1966 | Johswich | 23—178 |
| 1,832,325 | 11/1931 | Rosenstein | 23—225 |
| 2,168,150 | 8/1939 | Baehr et al. | 23—225 X |
| 2,781,863 | 2/1957 | Bloch et al. | 23—225 |
| 2,946,652 | 7/1960 | Bloch | 23—3 |
| 3,079,238 | 2/1963 | Handwerk | 23—226 |

FOREIGN PATENTS 681,438  3/1964  Canada.

OSCAR R. VERTIZ, Primary Examiner

G. O. PETERS, Assistant Examiner

U.S. Cl. X.R.

55—73